A. J. MATHESON.
TRANSMISSION GEAR.
APPLICATION FILED MAY 28, 1914.

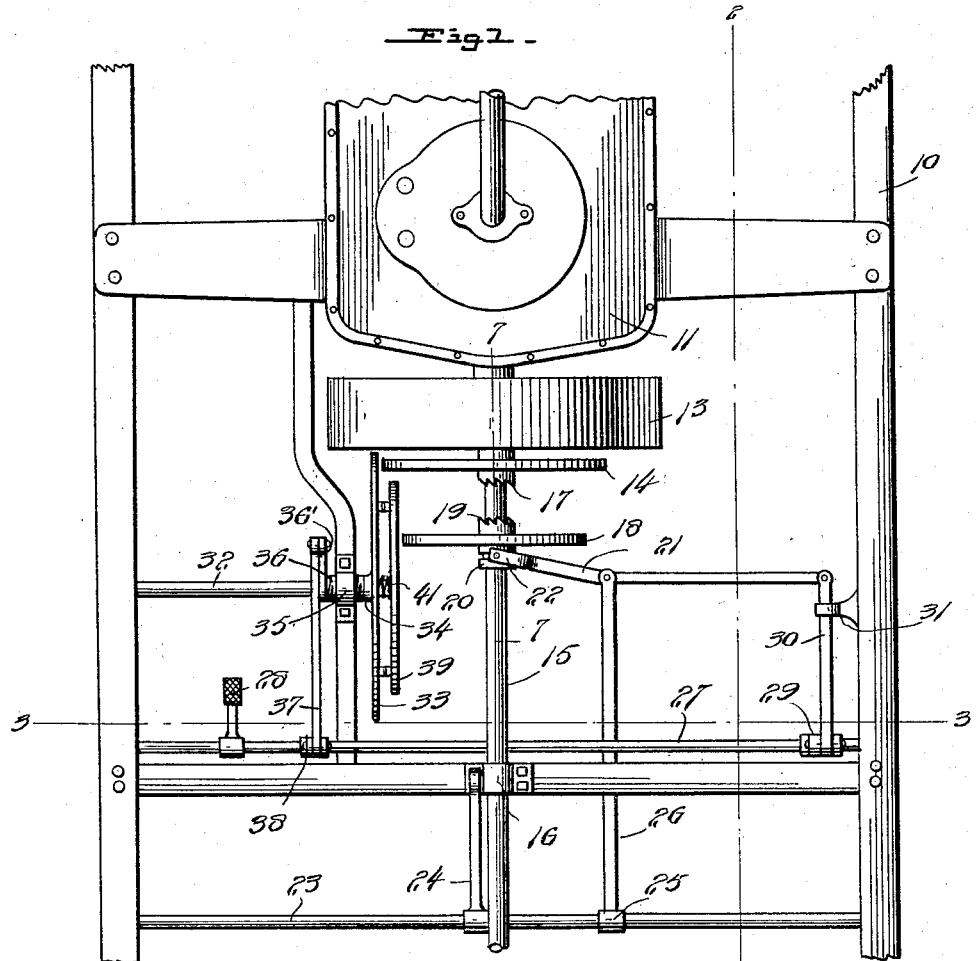

1,177,880.

Patented Apr. 4, 1916.
2 SHEETS—SHEET 2.

UNITED STATES PATENT OFFICE.

ARCHIBALD J. MATHESON, OF ROCKFORD, IOWA.

TRANSMISSION-GEAR.

1,177,880.  Specification of Letters Patent.  Patented Apr. 4, 1916.

Application filed May 28, 1914. Serial No. 841,587.

*To all whom it may concern:*

Be it known that I, ARCHIBALD J. MATHESON, a citizen of the United States, residing at Rockford, in the county of Floyd, State of Iowa, have invented certain new and useful Improvements in Transmission-Gear; and I do hereby declare the following to be a full, clear, and exact description of the invention, such as will enable others skilled in the art to which it appertains to make and use the same.

This invention relates to transmission gearing and has special reference to an improved form of transmission gearing especially adapted for use in connection with an automobile or the like.

The principal object of the invention is to improve and simplify the general construction of gearing of this type.

A second object of this invention is to provide an improved form of gearing wherein the drive at high speed will be positive while the drive at other speeds will be frictional.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and Figure 1 is a plan view of a portion of an automobile chassis showing the gearing arranged thereon. Fig. 2 is a section on the line 2—2 of Fig. 1. Fig. 3 is a section on the line 3—3 of Fig. 1. Fig. 4 is an enlarged detail view showing a portion of the clutch control. Fig. 5 is an enlarged detail view taken through two of the friction wheels and showing the spring buffer arrangement thereof. Fig. 6 is an enlarged detail view showing the clutch for direct drive. Fig. 7 is an enlarged detail section on the line 7—7 of Fig. 1.

In the showing in the present drawings, which discloses one embodiment of the invention, there is provided an automobile frame 10 whereon is supported the engine 11 which is provided with the usual crank shaft, best seen in Fig. 7, and indicated at 12. On this crank shaft is mounted the fly wheel 13 and against this fly wheel is mounted a friction wheel 14 the hub of which extends rearwardly of the end of the crank shaft 12 so as to provide a forward bearing for the power or drive shaft 15, a rear bearing 16 being also provided on the frame 10 for this shaft 15. The shaft is thus normally free to rotate with respect to the shaft 12.

On the disk 14 there is provided a series of clutch teeth 17 and splined on the shaft 15 is a second friction disk 18 of smaller diameter than the first disk 14 and like it provided with clutch teeth 19 which face the clutch teeth 17 so that when the disk 18 is moved toward the disk 14 the two clutches coöperate to lock the two disks together. The disk 18 is provided with a hub 20 having a shipper groove therein and a shipper lever 21 is provided with the usual fork 22 for engaging said groove. Extending across the frame 10 is a rock shaft 23 whereon is mounted a hand lever 24 so that the rock shaft may be rotated by the operator. Extending from this rock shaft is likewise a rock arm 25 which is connected by a link 26 with the lever 21. At 27 is a second rock shaft which is arranged to be operated by means of a foot pedal 28 and depending from this second rock shaft is a rock arm 29 connected by a link 30 with the end of the lever 21 opposite its fork. This link 30 is guided in a suitable bracket 31 carried on the side of the frame. It will thus be noted that by means of either the pedal 28 or the lever 24 the disk 18 may be moved to and fro along the shaft 15.

Mounted in suitable bearings on the frame 10 is a transverse shaft 32. On this shaft 32 is a friction disk 33 which is provided with a hub 34. At 35 is indicated one of the bearings for the shaft 32 and this particular bearing is provided with an inner sleeve 36 which is threaded into the bearings and which butts against the hub 34. Thus if the sleeve be revolved the disk 33 will be moved along the shaft 32. Connected to the sleeve is an arm 36' which extends radially from the sleeve and is connected by a link 37 with a rock arm 38 on the shaft 27. Formed on the hub 34 is the hub of a friction disk 39. Extending between the disks 33 and 39 are links 41' which are loosely secured to posts 40 on the said disks so that the disks will be prevented from having relative rotary motion. The disks 33 and 39 are urged apart by a coil spring 41 which encircles the hub of the disk 39 and has one end bearing against the said disk and the other end against the disk 33.

It will be obvious that when the two disks 18 and 14 are so arranged that the clutches 17 and 19 are in engagement the shaft 15 will be driven at the same speed as the shaft 12. If, the lever 24 be now manipulated to draw the disk 18 away from the disk 14 and the pedal 28 be also manipulated to bring the two disks 33 and 39 into engagement with the respective disks 14 and 18 then the drive will be a friction drive and the speed will depend on the distance of the disk 18 from the center of the shaft 32. Furthermore the direction of the drive will depend upon the position of said disk 18 to the front or rear of the center line of said shaft 32. It will thus be plain that a variety of speeds may be obtained by proper manipulation of the lever 24 and pedal 28.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention what is claimed as new, is:—

1. In a friction gearing, a plurality of parallel friction wheels, means to move said wheels axially, and yieldable means to permit movement of one of said wheels independently of the other, said means comprising a spring located between said wheels.

2. In a friction gearing, a driving shaft, a driven shaft, a friction gear fixed on said driving shaft, a second friction gear slidable on the driven shaft, a pair of friction gears arranged at right angles to the first mentioned gears and each adapted to engage a respective first mentioned gear, means to move said pair of gears into and out of engagement with the first mentioned gears, and a spring between the gears of said pair.

3. In a friction gearing, a driving shaft, a driven shaft, a friction gear fixed on said driving shaft, a second friction gear slidable on the driven shaft, a pair of friction gears arranged at right angles to the first mentioned gears and each adapted to engage a respective first mentioned gear, means to move said pair of gears into and out of engagement with the first mentioned gears, a spring between the gears of said pair, and clutch teeth on each of the first mentioned gears whereby to lock said gears for synchronous movement.

In testimony whereof, I affix my signature, in the presence of two witnesses.

ARCHIE J. MATHESON.

Witnesses:
MILO B. JIMISON,
ARTHUR O'HARRON.

Copies of this patent may be obtained for five cents each, by addressing the "Commissioner of Patents, Washington, D. C."